Figure 1:
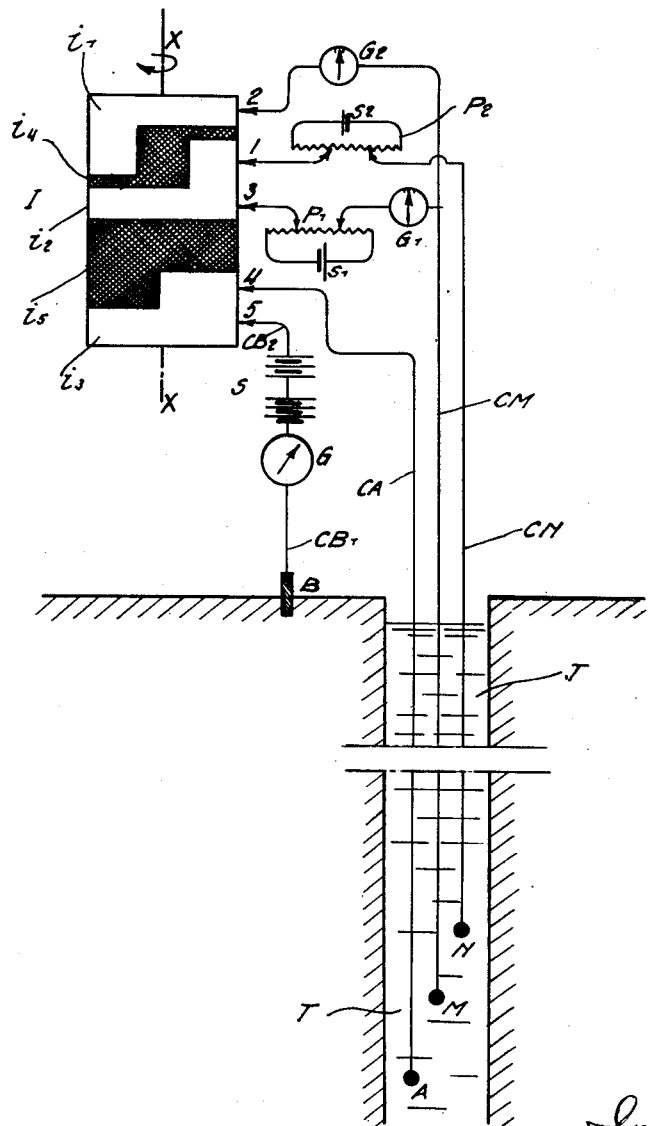

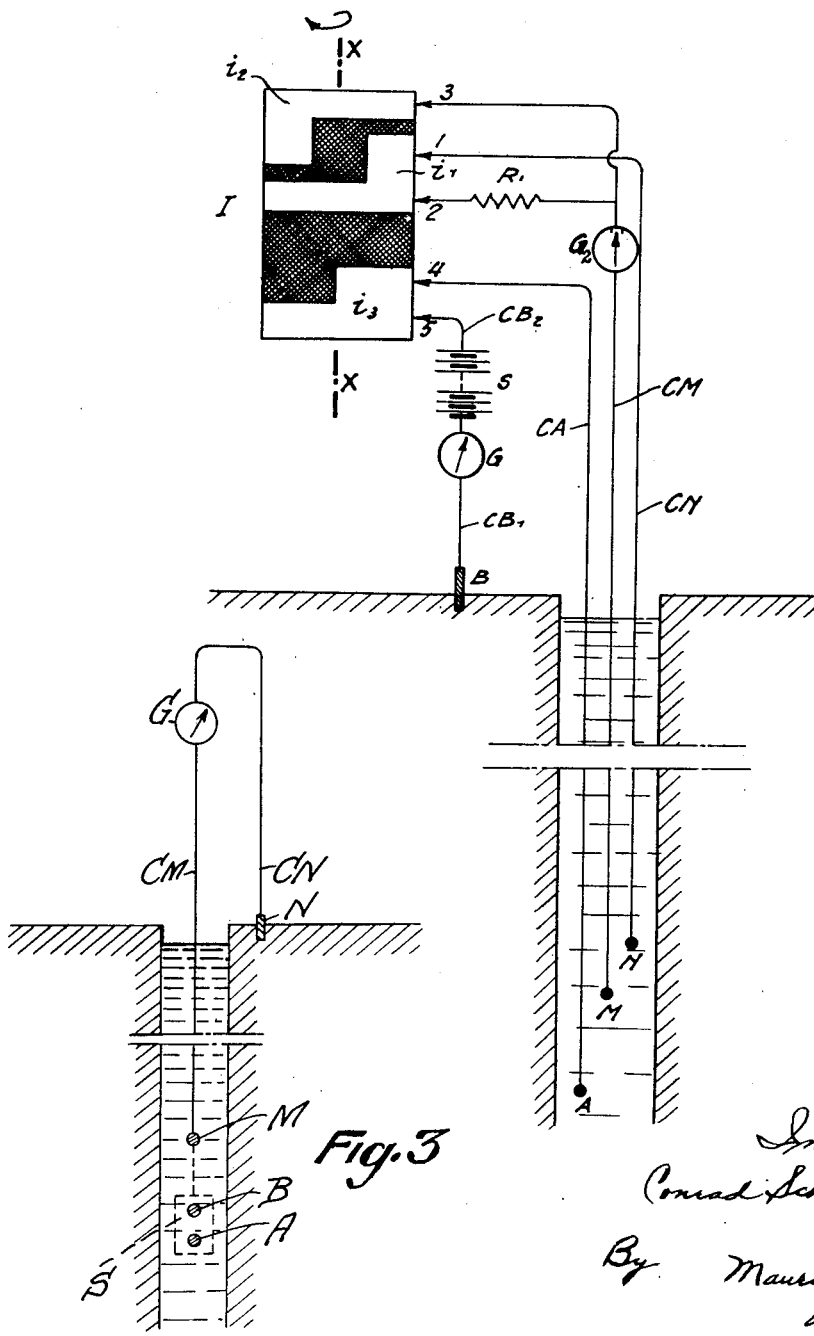

Patented Oct. 3, 1939

2,174,638

UNITED STATES PATENT OFFICE 2,174,638

METHOD AND APPARATUS FOR ELECTRICAL SURVEY OF THE FORMATIONS CUT BY A BORE HOLE

Conrad Schlumberger, Paris, France; Anne Marguerite Louise Doll, administratrix of said Conrad Schlumberger, deceased, assignor to Societe de Prospection Electrique Procedes Schlumberger, Paris, France, a corporation of France Application August 31, 1935, Serial No. 38,843
In France June 12, 1935

3 Claims. (Cl. 175—182)

It is known that the nature of the different strata cut by a bore hole in the part of it not yet lined with casing can be determined by electrical measurements carried out at the various depths to be investigated and in particular by measuring the resistivities of these strata. Likewise it is possible to measure in the bore hole, if previously filled with water, the potential differences spontaneously existing at the depths of the various beds traversed, more particularly for the purpose of determining the porous beds intersected by the bore hole.

The measurement of resistivity can be carried out in particular by passing a current into the ground by means of two electrodes electrically connected to a source of current and then by measuring the difference of potential produced between two other electrodes.

It is known then that if $i$ is the strength of the current, if $r$ and $r'$ respectively are the distance between the the current supply electrode lowered into the bore hole and the two measuring electrodes, and if $\Delta V$ is the potential difference measured between these two electrodes, the application of Ohm's law for calculating the resistivity $\rho$ leads to the formula:

$$\rho = 4\pi \frac{\Delta V}{i} \times \frac{rr'}{r'-r}$$

It should be noted that the method just referred to results in the measurement of a difference of potential which is the sum of the potential difference E produced by passing the current into the ground and the spontaneous potential difference $e$. To obtain the exact value of the potential difference E resulting from the passage of the current, from which value the exact value of the resistivity of the formation is deduced, it would be possible first of all to measure at each depth the spontaneous potential difference $e$, without any current being sent into the ground, and then to send a current into the ground, and to measure the increase in potential difference produced by this current. Such a method is in any case very inconvenient for taking a continuous record of the potential difference E over the whole unlined depth of the bore hole.

U. S. Patent No. 1,826,961 describes a method which makes it possible to determine the potential difference E directly and is based on the use of an alternating current or a periodically reversed current.

Likewise it has been proposed in French patent application filed June 4, 1935, under No. 385,977 and entitled "Improvements in methods and arrangements for electrical survey of the formations traversed by a bore hole", to carry out a direct determination, very close to the real value, of the potential difference E and consequently of the resistivity of the formations, by using direct current but by increasing the strength of current supplied by the electrodes to such an extent that the spontaneous potential difference $e$ becomes relatively small as compared to E, and the potential difference E+$e$ can thus be taken for some purposes to be substantially equal to the potential difference E, which theoretically should have been measured alone.

The object of the present invention is a method by which measurement and continuous recording of the resistivities of the formations cut by a bore hole can be effected directly in terms of the depth, and if required the spontaneous potential difference can be measured and recorded at the same time or independently. This method essentially consists in passing into the ground a periodically interrupted direct current interrupted for instance 5 to 20 times per second of known strength and in measuring at the various depths to be investigated the potential differences produced between the two measuring electrodes. The values obtained during the interruption of the current or dead times then represent the spontaneous potential differences which can be measured separately, while the values obtained during the passage of the current represent the total potential differences, from which the spontaneous potential differences can be eliminated either operatively or by calculation.

In carrying out the methods considered in the present invention, the measurements of potential differences can be carried out either by a potentiometer method giving directly the values of potential differences, or by a galvanometer method, in which the potential differences are deduced from measurements of the current produced in the circuit of the measuring apparatus by the potential differences to be measured.

In applying the potentiometer method two potentiometers with control galvanometers may be used; one of these potentiometers serves during the dead periods for measuring the spontaneous potential difference $e$ and for compensating this difference of potential, and the second serves during the periods of passage of current for measuring the potential difference E from which the resistivity of the ground is deduced, the spontaneous potential difference $e$ being during these periods compensated for the greater part by the first potentiometer.

In this arrangement it is advantageous to pass into the ground such currents that the potential difference E is large in comparison with the spontaneous potential difference e so as to reduce in the control galvanometer for E any influence of the current due to the residue of the spontaneous potential difference not compensated completely.

It is also advantageous in the first arrangement to make provision in the control galvanometer associated with the potentiometer for the measurement of the potential difference E for the reversal during the dead periods of the current due to the spontaneous potential difference e or to its non-compensated residue, so as to obtain a measurement of the potential difference E independently of the measurement and the compensation of the spontaneous potential difference.

This last arrangement can also be used to effect the measurement of the potential difference E by itself, when the potentiometer previously provided for measuring the spontaneous potential difference e and the corresponding control galvanometer are omitted; the uncompensated spontaneous potential difference e being then alternated at the terminals of the control galvanometer associated with the potentiometer for measuring E.

As has been stated above, the measurement of potential differences can also be carried out according to the invention by a galvanometer method. If the measuring electrodes are called M and N and if $\Delta V$ is the potential difference existing between these two electrodes, the strength $i$ of the current passing in the circuit connecting the electrodes M and N to a measuring galvanometer is given by the formula:

$$i = \frac{\Delta V}{R + r_M + r_N}$$

in which R is the constant total resistance of the measuring circuit between the electrodes M and N, while $r_M$ and $r_N$ respectively are the resistances of the spaces surrounding the said electrodes. These resistances are made up of the portions of the bore hole mud located in the immediate neighborhood of the electrodes M and N when both of them are immersed in the bore hole. If only one of the electrodes is immersed in the bore hole the resistances are made up of the portion of mud surrounding it and of the ground connection of the second electrode placed at the surface.

These resistances are comparatively low in relation to R, and moreover their variations are relatively small, even becoming nil in the case of the electrode placed at the surface. It is therefore possible to consider the expression $R + r_M + r_N$ as constant. On the other hand the equipotential lines are not modified appreciably by the presence of the electrodes M and N and by the passage of the relatively small current traversing the measuring circuit and the space between M and N. It is therefore reasonable to assume that the current passed from these electrodes into the measuring galvanometer is practically proportional to the potential difference which would exist between the points occupied by electrodes M and N if they had not been there.

The use of the galvanometer measuring method has various advantages over the potentiometer method. The latter necessitates compensation by potentiometers, that is to say the intervention of a relatively important auxiliary source of energy for operating the potentiometers. It thus requires either the continuous intervention of operators or, if the compensation arrangement is automatic, the use of amplifiers and servo-motors of sufficient power and rapidity of action. These arrangements have usually a certain time lag which limits the recording speed. The galvanometer method on the other hand, which consists in simply measuring a current, makes it easy to achieve very sensitive, automatic and rapid recording.

In the application of this method it is possible, while using a single sufficiently rapid galvanometer, to secure the record, for instance on an ordinary photographic strip, of two curves, one corresponding to the spontaneous potential difference which manifests itself only during the dead periods and the other to the sum of the spontaneous potential difference and the potential difference produced by the passage of the current sent into the ground. In particular, this method of application makes it possible to lower the source of current into the bore hole with the two current supply electrodes and one only of the measuring electrodes or both the measuring electrodes, and consequently to use a single conductor cable connecting the measuring electrode lowered into the bore hole to the galvanometer, or, if both measuring electrodes are lowered into the bore hole, a twin cable connecting them to the galvanometer.

By inserting a sufficiently high resistance R' into the measuring circuit during the periods when current is passed into the ground and by increasing the strength of this current, the error introduced into the reading by the spontaneous potential difference e can be made relatively small, and consequently a very close direct measurement of the potential difference due to the passage of current in the ground can be obtained, from which the resistivity of the ground can be deduced accurately.

Likewise two rapid galvanometers may be used to effect separate recording of the potential differences existing between the measuring electrodes during the dead periods and during the periods of passage of current in the ground. In this case it is also possible to make the influence of the spontaneous potential difference relatively small during the second periods, by inserting a suitable additional resistance in the corresponding measuring circuit so as to reduce its sensitiveness, whilst then of course increasing the strength of current passed into the ground. This will increase the potential difference E to be measured and make it produce considerable deflections on the galvanometer in spite of the increased resistance of the circuit.

Finally, by using slow galvanometers and by reversing during the dead periods the galvanometer serving to measure the potential difference from which the earth resistivity is obtained, the influence of the spontaneous potential difference can be totally eliminated from this measurement. Such an arrangement is very suitable also for continuous recording.

Figure 2:
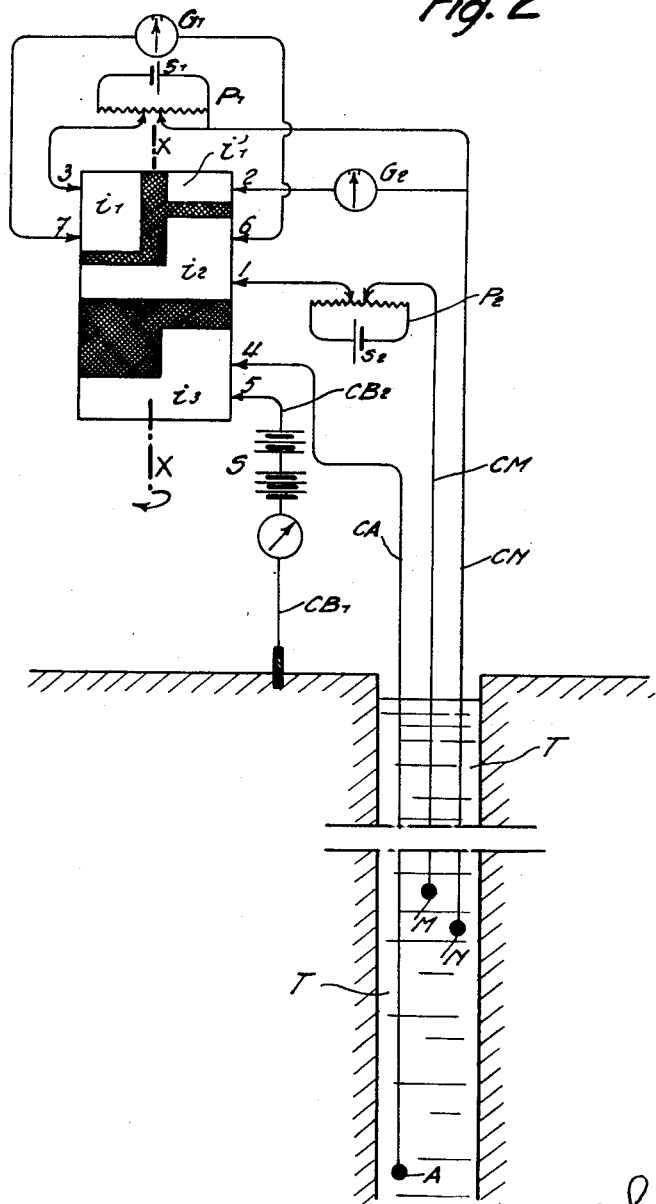
Figure 5:
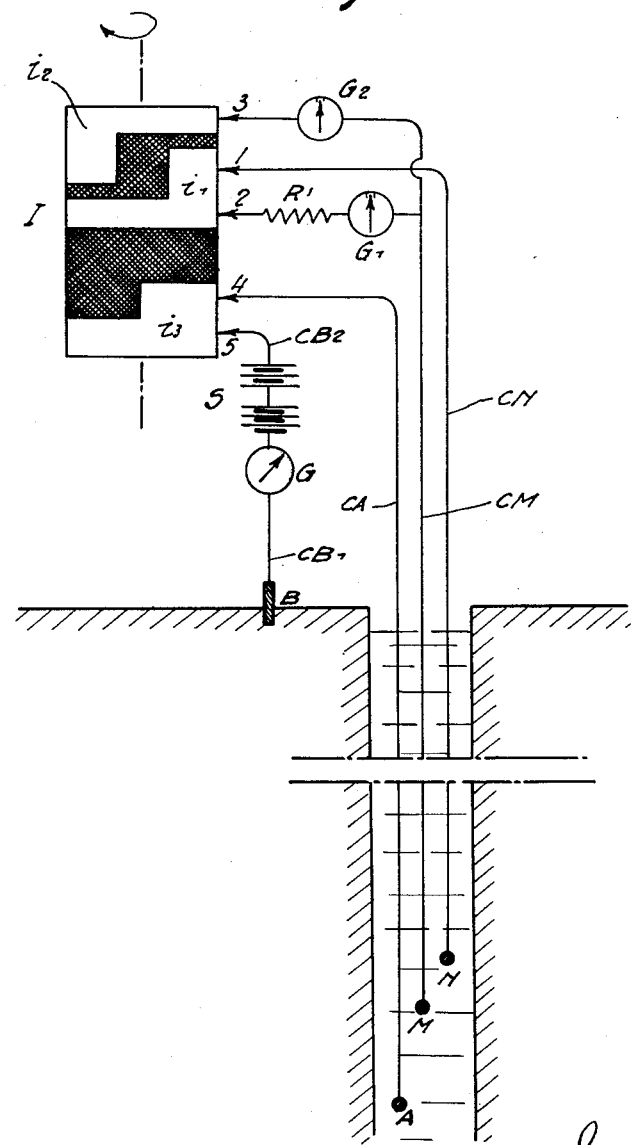
Figure 6:
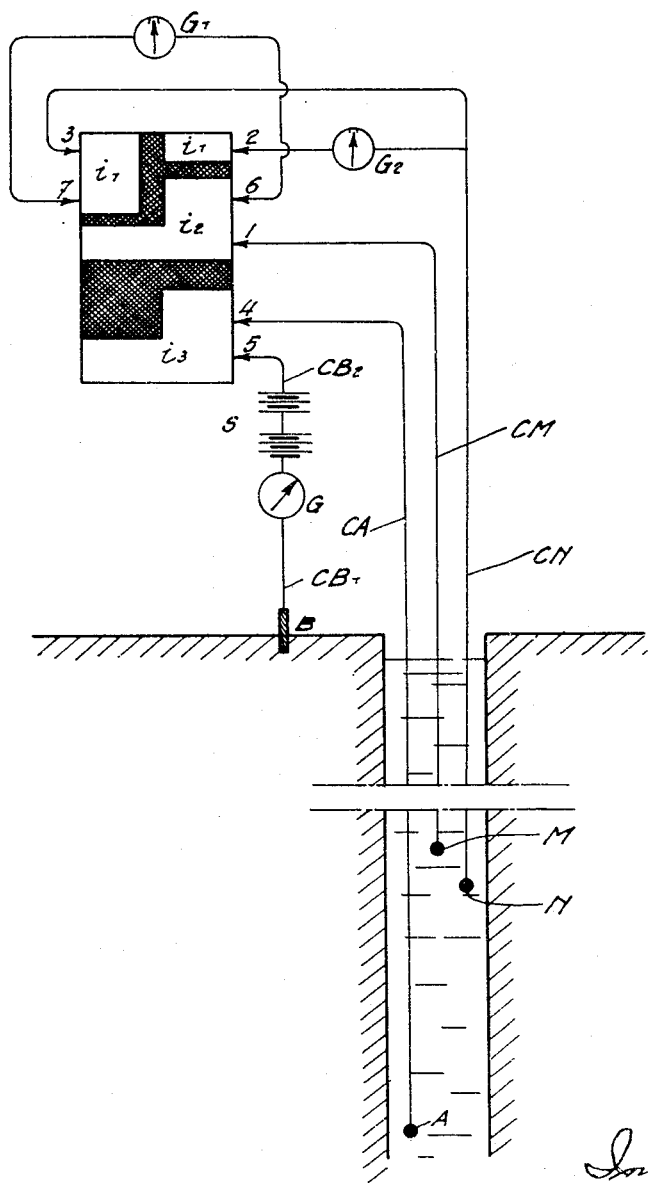

The accompanying drawings show diagrammatically by way of example various ways in which the invention may be put into practice, and therein Figure 1 is a section along the bore hole with certain parts in elevation of one arrangement utilizing the potentiometer method, Figure 2 is a similar view of a second arrangement in which the same method is applied, Figure 3 is a similar view of an arrangement utilizing the galvanometer method, Figure 4 and 5 are similar views of two other arrangements in which the galvanometer method is likewise applied, and Figure 6 is a similar view of an arrangement utilizing the galvanometer method with slow galvanometers.

In the arrangement shown in Figure 1 T is the bore hole and S the source of current. A and B are the current supply electrodes and $CB_1$, $CB_2$ and CA are the leads to them. M and N are the measuring electrodes with their leads CM and CN. I is the commutator; $P_1$ and $P_2$ are potentiometers with their sources of current $S_1$ and $S_2$; G is a galvanometer for measuring the current, $G_1$ and $G_2$ are control galvanometers having a fairly high time constant in relation to the period of interruption of the current. 1, 2, 3, 4, 5 are contact members applied to the conducting segments $i_1$, $i_2$, $i_3$ of the commutator I, which latter are insulated from each other by insulating sectors $i_4$, $i_5$. The commutator I is rotated on its axis $x$—$x$ by a motor not shown, thus providing in alternation the sets of connections enumerated under (a) and (b), (a) {
Segment $i_1$ to contact 2
Segment $i_2$ to contacts 1 and 3
Segment $i_3$ to contacts 4 and 5
}

(b) {
Segment $i_1$ to contacts 2 and 1
Segment $i_2$ to contact 3
Segment $i_3$ to contact 5
} and so on.

With the (b) connections the current supply through the electrodes A and B is cut off at 4. At the same time electrodes M and N are connected through the galvanometer $G_2$ by the contacts 2 and 1 and the segment $i_1$. The potentiometer $P_2$ is also in series in the same circuit, and for bringing the reading of the galvanometer $G_2$ to zero this potentiometer is adjusted to compensate and measure the potential difference $e$ and if desired to record it.

With the (a) connections the circuit is closed for the current to pass between electrodes A and B; electrodes M and N are connected by the contacts 1 and 3 through the potentiometer $P_1$, the galvanometer $G_1$ and the potentiometer $P_2$. The latter remains in the measuring circuit and so compensates the potential difference $e$. Accordingly the potentiometer $P_1$ provides compensation and measurement of the potential difference E alone, which gives the resistivity.

In the case of Figure 2 the same references indicate the same elements as in Figure 1, but the segment $i_1$ is subdivided into two segments $i_1$ and $i'_1$ insulated from each other. The commutator provides the following sets of connections in alternation:

(a') {
Segment $i'_1$ to contact 2
Segment $i_1$ to contacts 3 and 7
Segment $i_2$ to contacts 6 and 1
Segment $i_3$ to contacts 4 and 5
}

(b') {
Segment $i'_1$ to contact 3
Segment $i_1$ to contacts 2 and 6
Segment $i_2$ to contacts 1 and 7
Segment $i_3$ to contact 5
} and so on.

Consequently with the (b') connections no current is passed through electrodes A and B. At the same time electrodes M and N are connected together through the circuit: lead CM, potentiometer $P_2$, contact 1, segment $i_2$, contact 7, galvanometer $G_1$, contact 6, segment $i_1$, contact 2, galvanometer $G_2$, lead CN.

In this position it is possible on the one hand to measure the spontaneous potential difference, and on the other hand to compensate it, this compensation being maintained when the connections are changed by the commutator I.

With the (a') connections current is passed through the electrodes A and B. At the same time electrodes M and N are connected through the circuit: lead CM, potentiometer $P_2$, contact 1, segment $i_2$, contact 6, galvanometer $G_1$, contact 7, segment $i_1$, contact 3, potentiometer $P_1$, lead CN.

In this case the control galvanometer $G_1$ for the potentiometer $P_1$ measuring the resistivity is reversed so that any residue of the spontaneous potential difference which is not compensated by the potentiometer $P_2$ now acts in the opposite direction to that determined by the previous set of connections; the total effect of the spontaneous potential difference is zero if care is taken to give equal resistances to the circuits which are not common to the two sets of connections.

The resistivity alone may be recorded without measuring and compensating the spontaneous potential difference by omitting from this last arrangement the potentiometer $P_2$ and the galvanometer $G_2$.

In the case of Figure 3 the source of current S is lowered into the bore hole together with electrodes A and B, which are connected to its poles, and with the commutator (not shown) which periodically closes and breaks the circuit; electrode M is in the bore hole, while electrode N is at the surface. A galvanometer G of the oscillograph type, having a time constant much lower than the interruption period of the current, is inserted by means of the leads CM and CN between electrodes M and N.

During the stage at which current is not being sent through electrodes A and B, the galvanometer assumes a deflection proportional to the spontaneous potential difference $e$. During the current supply stage it assumes a deflection proportional to the sum of E and $e$. By recording two curves would then be obtained, one corresponding to $e$, the other to E+$e$. To deduce the resistivity all that is necessary is to subtract the corresponding ordinates of the two curves.

It should be noted that in this case the measuring circuit does not require any commutator, so that the means for producing interrupted current may be immersed in the bore hole and a single conductor is sufficient for the cable running down the bore hole.

In the case of Figure 4 the same references indicate elements similar to those of Figure 1. There are no potentiometers; the measurements are carried out by a galvanometer G having a time constant similar to that of Figure 3. The commutator I makes the following sets of connections in alternation:

(a'') {
Segment $i_1$ to contacts 1 and 2
Segment $i_2$ to contact 3
Segment $i_3$ to contacts 4 and 5
}

(b'') {
Segment $i_1$ to contact 2
Segment $i_2$ to contacts 3 and 1
Segment $i_3$ to contact 5
}

Thus with the (b'') connections, no current is passed through electrodes A and B. At the same time electrodes M and N are connected through the circuit: lead CM, galvanometer $G_2$, contact 3, segment $i_2$, contact 1 and lead CN. During this stage the galvanometer $G_2$ is deflected in proportion to the current passing through it, that is to say:

The current $I_2 = \dfrac{e}{R}$

R being the total resistance of the measuring circuit.

With the $(a'')$ connections current is passed through electrodes A and B. Electrodes M and N are then connected through the circuit: lead CM, galvanometer $G_2$, resistance $R'$, contact 2, segment $i_1$, contact 1, lead CN. During this time the galvanometer deflection is proportional to the current passing through it, that is to say:

The current $I_1 = \dfrac{E}{R+R'} + \dfrac{e}{R+R'}$

By making $R'$ sufficiently large and by passing sufficiently strong currents through electrodes A and B, it is possible to lessen as desired the influence of $e$, while keeping the effect of E at a suitable value. By recording the deflections obtained during the two stages, two curves are obtained, one of which gives, true to a constant factor, the spontaneous potential difference, and the other an almost exact value of the potential difference E, that is to say of the resistivity.

In the case of Figure 5, the same references again denote the same elements as in Figure 4. The measurements here are carried out by two galvanometers $G_1$ and $G_2$ similar to the galvanometers of Figures 3 and 4. The rotating commutator I makes the same sets of connections as in Figure 4.

Thus with the $(b'')$ connections in which no current is passed through electrodes A and B, electrodes M and N are connected by the circuit: lead CM, galvanometer $G_2$, contact 3, segment $i_2$, contact 1, lead CN. The galvanometer $G_2$ thus records the spontaneous potential difference.

With the $(a'')$ connections, when current is being passed through electrodes A and B, electrodes M and N are connected by the circuit: lead CM, galvanometer $G_1$, resistance $R'$, contact 2, segment $i_1$, lead CN. Thus the galvanometer $G_1$ records, as in the case of Figure 4, an almost exact value of the resistivity, because the spontaneous potential difference, in consequence of the insertion of $R'$ in its circuit, has only a relatively small effect on this galvanometer. In the arrangement described the single galvanometer of Figure 4 is thus replaced by two galvanometers $G_1$ and $G_2$.

A modification of this arrangement consists in taking the resistance $R'=0$; then, as in the case of Figure 3, two curves would be obtained on the two galvanometers, of which one would represent the spontaneous potential difference and the other the potential difference $E+e$. The difference between the ordinates would, as before, give the potential difference E.

In Figure 6 the same references indicate the same elements as in Figure 2. $G_1$ and $G_2$ are deflection galvanometers having a high enough time constant so as not to oscillate under the effect of the periodical variations of current of the frequency of the interrupted current, but yet high enough to exhibit accurately the mean value of the current passing through them.

The commutator makes the same sets of connections as in Figure 2. Consequently, with the $(b')$ connections, when no current is passed through electrodes A and B, electrodes M and B are connected by the circuit: lead CM, contact 1, segment $i_2$, contact 7, galvanometer $G_1$, contact 6, segment $i_1$, contact 2, galvanometer $G_2$, lead CN.

With the $(a')$ connections, when current is passed through electrodes A and B, electrodes M and N are connected by the circuit: lead CM, contact 1, segment $i_2$; contact 6, galvanometer $G_1$, contact 7, segment $i_1$, contact 3, lead CN.

The galvanometer $G_2$, which is in circuit only with the $(b')$ connections, takes up a deflection proportional to the mean current passing through it and so records the spontaneous potential difference $e$. The galvanometer $G_1$ is in circuit at both stages, but its terminals are reversed in one set of connections as compared with the other in relation to M and N. The spontaneous potential difference thus gives the galvanometer opposite impulses during equal times, and if care is taken to ensure that the resistances of the measuring circuits corresponding to the two stages are equal, the total effect of these impulses is zero. In addition, the galvanometer $G_1$ receives with the $(a')$ connections a current due to the potential difference E; thus it registers the mean value of this current, that is to say the resistivity of the formations.

In the arrangements described in Figures 5 and 6 the recording means for the two quantities, spontaneous potential difference and resistivity, are entirely independent, and it would of course be quite possible if desired to record only one of these quantities, omitting the galvanometer associated with the other quantity.

In this specification and the claims it must be understood that the term "galvanometer" is used in its broadest sense to cover any instrument for measuring or indicating a current passing through it.

What I claim is:

1. A method of electrical survey of the strata in the neighborhood of a bore hole at the part thereof not yet lined with casing but filled with water, which method consists in passing into the ground at various depths a periodically interrupted current, and measuring the potential differences thus created in the bore hole, first during the passages and second during the interruptions of current.

2. A method of electrical survey of the strata in the neighbourhood of a bore hole at the part thereof not yet lined with casing but filled with water, which method comprises the steps of passing into the ground at various depths a periodically interrupted current between a point in the bore hole at the level of the formations to be surveyed and a point in the space comprising the bore hole and the surrounding formations, and measuring the potential differences between a point of the bore hole near the first point at which the current is supplied and a point in the space comprising the bore hole and the surrounding formations, first during the passages and second during the interruptions of current.

3. A method of electrical survey of the strata in the neighbourhood of a bore hole at the part thereof not yet lined with casing but filled with water, which method comprises the steps of passing into the ground at various depths a periodically interrupted current between a point in the bore hole at the level of the formations to be surveyed and a point in the space comprising the bore hole and the surrounding formations, and measuring the potential differences between a point of the bore hole near the first point at which the current is supplied and a point in the space comprising the bore hole and the surrounding formations, first during the interruptions and second during the passage of current and subtracting from the said potential difference measured during the passage of the current the spontaneous potential difference occurring spontaneously alone during the cessation of current between the two points from which the measurement was taken.

4. A method of electrical survey of the strata in the neighborhood of a bore hole, which consists in passing into the bore hole and the surrounding strata at different depths a periodically interrupted current, and determining the electrical conditions at the level of the strata to be surveyed, first during the passage, and second during the interruption, of the current.

5. A device for the electrical surveying of the strata traversed by a bore hole comprising means for passing a periodically interrupted current into the bore hole at different depths, and means for measuring the electrical conditions existing in the bore hole, both during the passage and during the interruption of the current.

6. A device for the electrical survey of the strata traversed by a drill hole in the part not yet lined with casing but filled with a conductive liquid, comprising an electrode adapted to be lowered into the bore hole at different depths, another electrode grounded, means including said electrodes for passing a periodically interrupted current in the bore hole, and means for measuring a quantity depending upon electrical potential differences between said two electrodes both during the passage and during the interruption of the current.

7. A device for the electrical survey of the strata traversed by a drill hole in the part not yet lined with casing but filled with a conductive liquid, comprising an electrode adapted to be lowered in the bore hole at different depths, another electrode grounded, an insulated conductor connecting said electrodes, means for passing a periodically interrupted emitted current into the bore hole, means including said electrodes for measuring the characteristics of the electrical current passing through said conductor during the passage of said current, and means for measuring the characteristics of the electrical current passing through said conductor during the interruption of the emitted current.

8. A device for the electrical survey of the strata traversed by a drill hole in the part not yet lined with casing but filled with a conductive liquid comprising two electrodes, of which at least one is adapted to be lowered in the bore hole at the depths of the strata to be surveyed, an electrical insulated conductor connecting said two electrodes, means for passing into the ground a periodically interrupted current, and means including said electrodes for measuring the characteristics of the current passing through said conductor, both during the passage and during the interruption of the emitted current through the ground.

CONRAD SCHLUMBERGER.